(12) United States Patent
Aakolk et al.

(10) Patent No.: US 11,086,844 B2
(45) Date of Patent: Aug. 10, 2021

(54) UNIFIED INSTANCE AUTHORIZATIONS WITH APPLICATION OWNED HIERARCHIES

(71) Applicant: SAP SE, Walldorf (DE)

(72) Inventors: Michael Aakolk, Wiesloch (DE); Andrea Waldi, Viernheim (DE)

(73) Assignee: SAP SE, Walldorf (DE)

( * ) Notice: Subject to any disclaimer, the term of this patent is extended or adjusted under 35 U.S.C. 154(b) by 401 days.

(21) Appl. No.: 16/192,335

(22) Filed: Nov. 15, 2018

(65) Prior Publication Data

US 2020/0159715 A1 May 21, 2020

(51) Int. Cl.
*G06F 16/23* (2019.01)
*G06F 16/9538* (2019.01)
*G06F 16/28* (2019.01)

(52) U.S. Cl.
CPC ........ *G06F 16/2365* (2019.01); *G06F 16/282* (2019.01); *G06F 16/9538* (2019.01)

(58) Field of Classification Search
CPC ........ G06F 16/20; G06F 16/951; G06F 16/21; G06F 16/245; G06F 16/24575; G06F 16/285; G06F 16/9535; G06F 3/0484; G06F 16/258; G06F 16/284; G06F 16/33; G06F 16/3329; G06F 30/20

USPC .......... 707/600–831, 899, 999.001–999.206
See application file for complete search history.

(56) References Cited

U.S. PATENT DOCUMENTS

| | | | | |
|---|---|---|---|---|
| 7,725,501 | B1 * | 5/2010 | Stillman | G06F 16/284 707/805 |
| 8,429,708 | B1 * | 4/2013 | Tandon | H04L 63/08 726/1 |
| 2012/0023077 | A1 * | 1/2012 | Kann | G06F 16/275 707/702 |
| 2014/0180939 | A1 * | 6/2014 | Frankland | G06Q 10/06 705/317 |
| 2018/0144150 | A1 | 5/2018 | Aakolk et al. | |

* cited by examiner

*Primary Examiner* — Angelica Ruiz
(74) *Attorney, Agent, or Firm* — Erise IP, P.A.

(57) ABSTRACT

Systems, methods, and computer programmable products are described herein for tracking modifications of a hierarchical database table of an application. Data including a modification to the hierarchical database table having a plurality of database entries is received. A change trigger table having a record corresponding to the modification of a database entry of the plurality of database entries is defined. The change trigger table is provided to a unified instance authorization application for further definition of an explosion database table.

20 Claims, 9 Drawing Sheets

FIG. 9

US 11,086,844 B2

UNIFIED INSTANCE AUTHORIZATIONS WITH APPLICATION OWNED HIERARCHIES

TECHNICAL FIELD

The subject matter described herein relates to enhanced techniques for monitoring database table modifications and facilitating modified information access across hierarchies of an application owned hierarchy.

BACKGROUND

User accounts can be created to control access to applications. A user name and password can be assigned to a person or a business partner who works with an application. User roles can be assigned to account and determine types of access that users are granted when using the application. For example, a group of users can be defined where a user from the group can view content of an application and make changes to such content (e.g., an "Author"). An application administrator can modify access rights for defined roles and/or create new roles.

The object instances associated with an application can be assigned with different authorization rights for different users. The object instances can be defined based on a data model, including a definition of attributes for the objects. Object instances can be organized in a hierarchical manner according to hierarchy criteria such as location or time. A hierarchy is an arrangement of objects which are linked together, either directly or indirectly, based on data relationships between the objects. For example, a tree structure or diagram can be used to represent a hierarchy in a graphical form. The tree structure can include a number of nodes (e.g., root nodes or leaf nodes). When a user logs into an application, her or she provides a username and password in order to start an authentication process. Authenticated users can perform actions and/or operations on object instances associated with the application. The user can be a part of different user groups having different roles. Authenticated user groups include one or more users whose identifies were authentications upon application log in.

SUMMARY

In one aspect, a method for tracking modifications of a hierarchical database table of an application includes receiving data having a modification to the hierarchical database table having a plurality of database entries. A change trigger table having a record corresponding to the modification of a database entry of the plurality of database entries is defined. The change trigger table is provided to a unified instance authorization application for further definition of an explosion database table.

In some variations, the explosion table associated with an object group collection can be defined. The object group collection can include one or more inherent object groups defined in a hierarchy.

In other variations, a database table view of the explosion database table can be provided to a user on a graphical user interface. The database table view can contain data updates incorporating the modification.

In some variations, the change trigger table can be provided to another application within the same hierarchy of the application for use across applications.

In other variations, a change type can be assigned to the modification based on data manipulation of the hierarchical database table made by the modification. The modification can include at least one of a deletion of the database entry within the hierarchical database table, a reassignment of the database entry to another database entry within the hierarchical database table, and a creation of a new database entry within the hierarchical database table.

In some variations, the hierarchical database table can be an application owned hierarchy providing a read interface at a database level. The hierarchical database table can be accessible to other hierarchies of the application. The hierarchical database table can be stored in an in-memory database.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter can facilitate multiple database hierarchy structures to run in parallel. Such parallel data processing can increase data processing speeds and/or facilitate dynamic database entry handling. Additionally, the subject matter herein provides a decoupling model between a hierarchy owning application and an explosion-update service. The subject matter describes database level interfaces between a hierarchy owning application and a re-use explosion-update service. The re-use explosion-update service can provide for increased processing performance during an evaluation of hierarchy authorizations. Use of the subject matter herein provides a solution for implementing hierarchy related instance authorizations.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

A hierarchy owning application provides read interfaces on a database level that can grant access to different hierarchies existing within the hierarchy owning application. A hierarchy owning application can also write hierarchy change trigger, making those accessible on a database level. The change triggers can be processed by an explosion update service in a unified instance authorization application. Unified instance authorizations, capabilities, and filter terms can be used to grant authorizations on instance objects assigned to a hierarchy. The hierarchy can be application owned and maintained by applications services such as those that own the instance object. Authorizations can be granted by object group collections. Modifications to application owned hierarchies can be identified in a hierarchical node view. A hierarchy provider can provide a change trigger which prompts an update of an explosion table. The updated explosion table can be used for facilitating performance improvements during hierarchy based authorizations evaluation time which are introduced by the usage of a precalculated explosion table. The explosion table can be calculated as an asynchronous follow-up process of the hierarchy design time and hierarchy based object group collection design time. Such executions and explosion table creation are described by U.S. Patent Publication No. 2018/0144150 A1, entitled "Unified Instance Authorization Based on Attributes and Hierarchy Assignment," the contents of which is incorporated herein by reference in its entirety.

Figure 1:
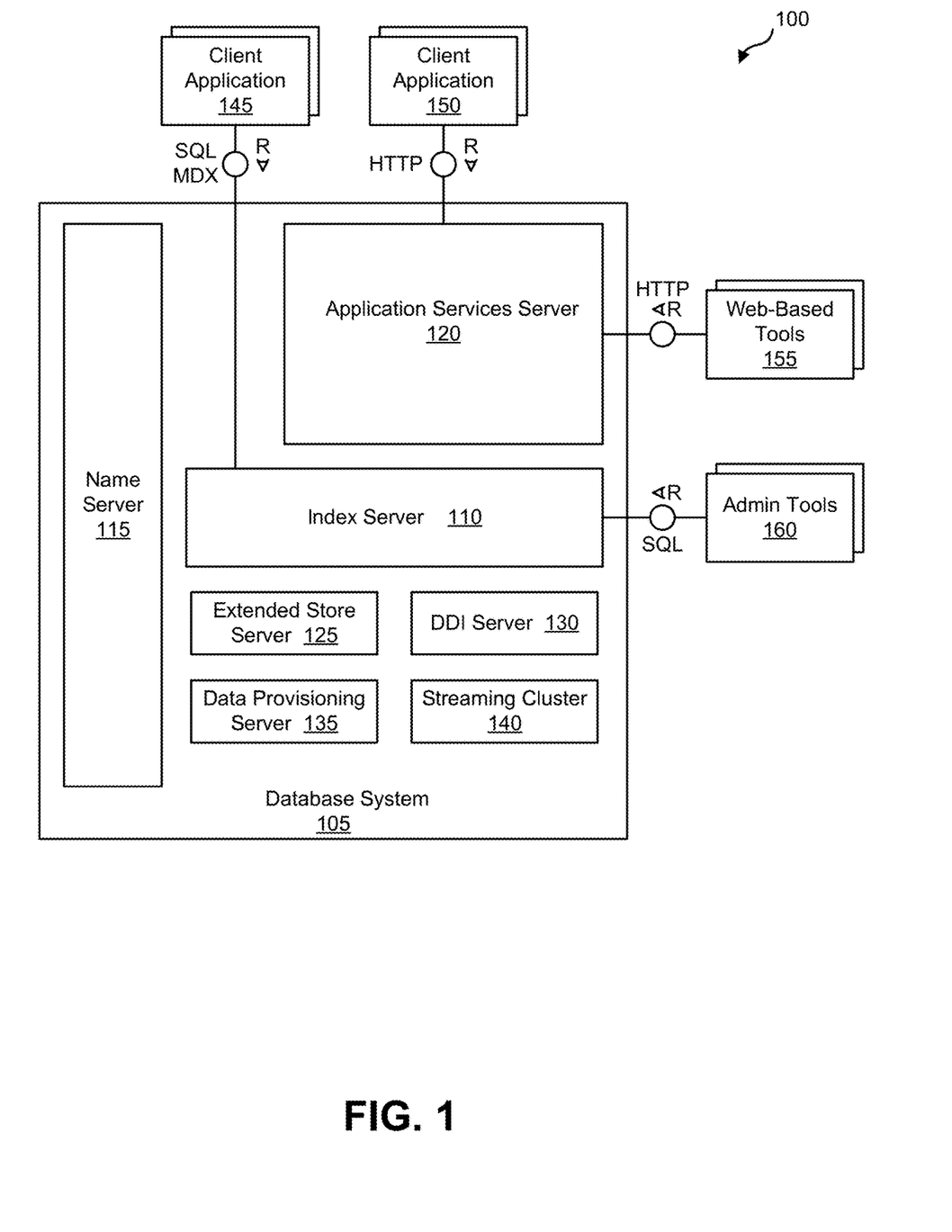
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application services server 120. The database system 105 can also include one or more of an extended store server 125, a database deployment infrastructure (DDI) server 130, a data provisioning server 135, and/or a streaming cluster 140.

The database system 105 can be accessed by a plurality of client applications 145, 150 via different protocols such as SQL/MDX (by way of the index server 110) and/or web-based protocols such as HTTP (by way of the application services server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also hosts the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application services server 120 can enable native web applications used by one or more remote clients 150 accessing the database system 105 via a web protocol such as HTTP. The application services server 120 can allow developers to write and run various database applications without the need to run an additional application server. The application services server 120 can also be used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
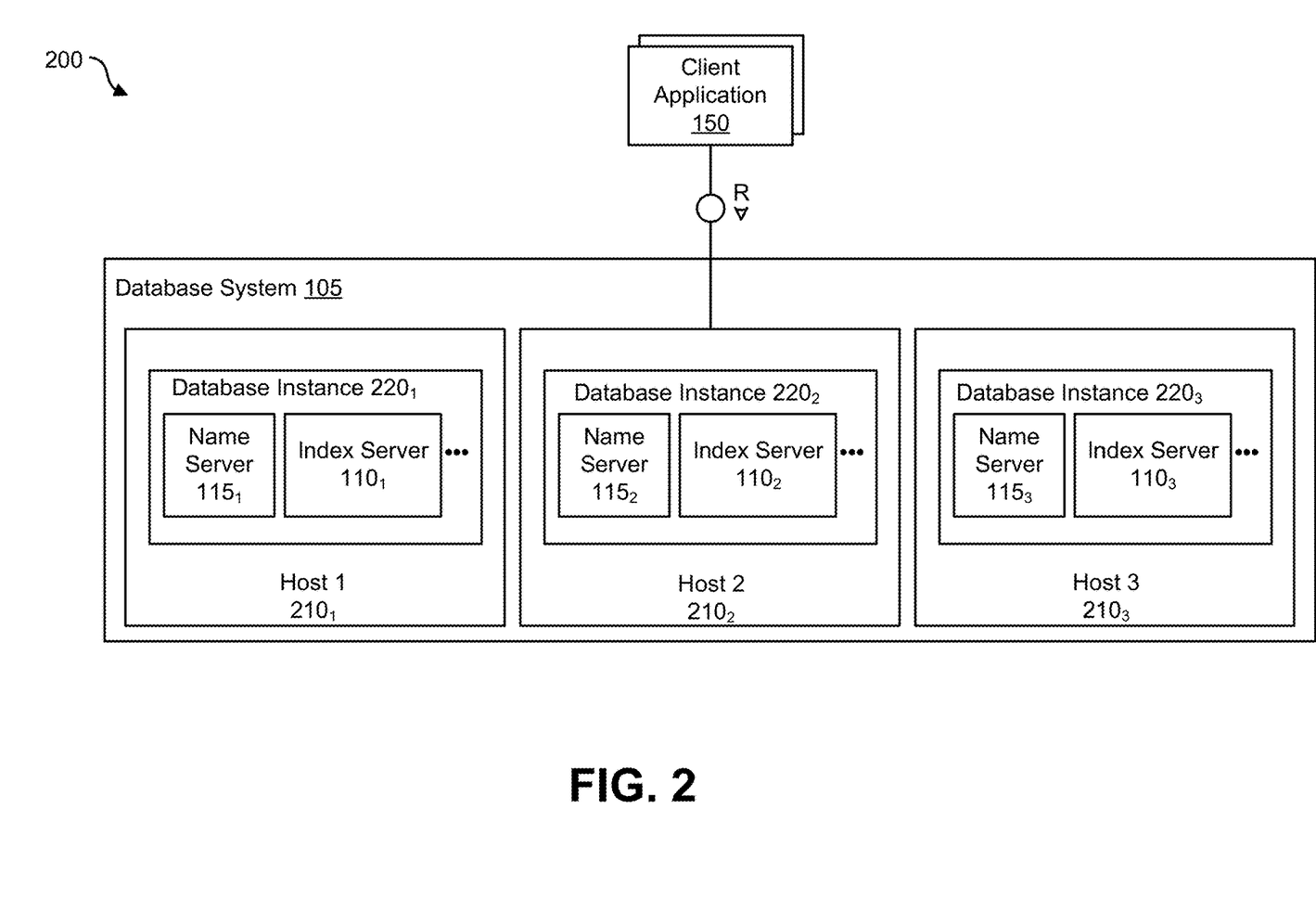
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
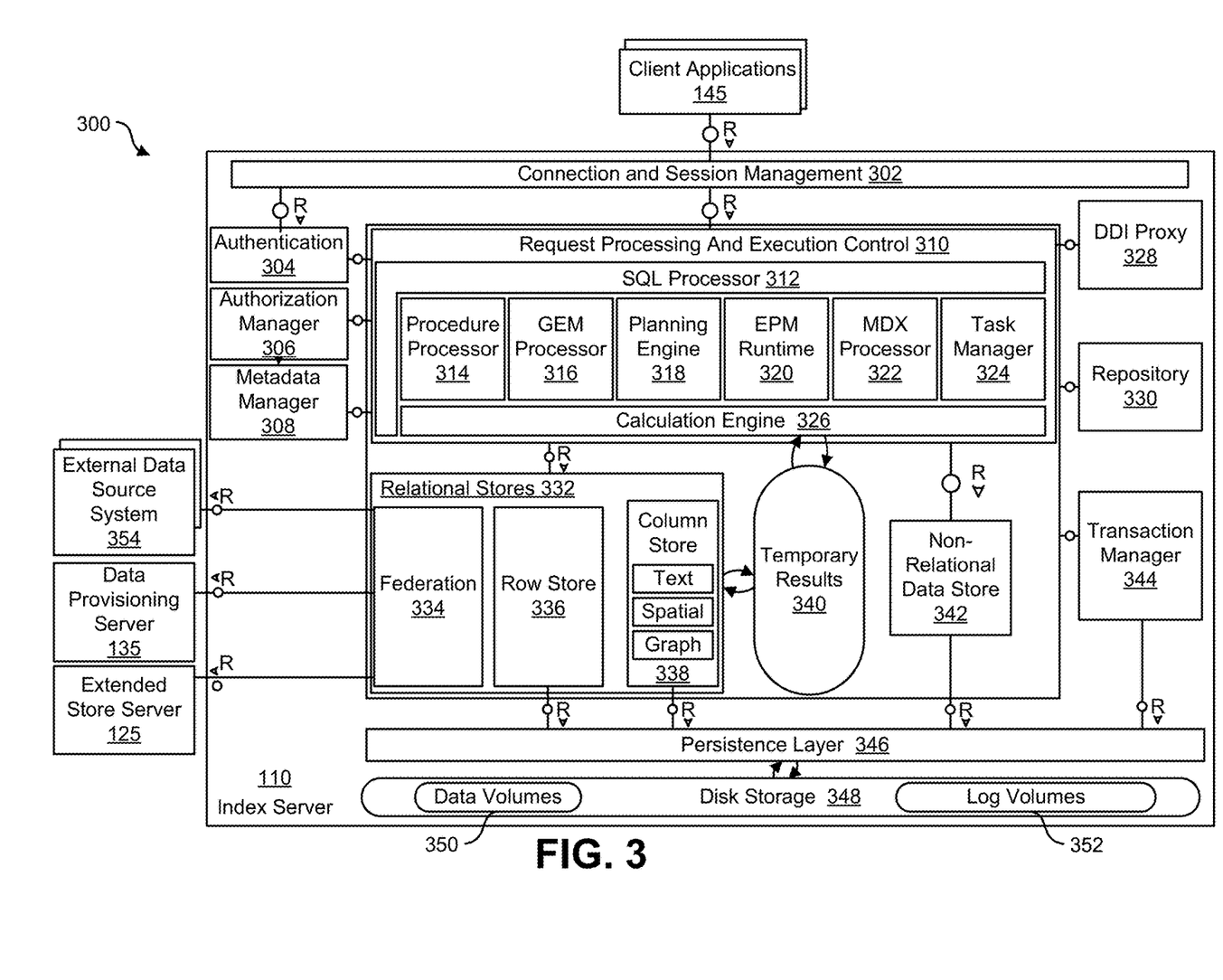
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 150. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 150 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 150 using the same network communication protocol. GEM statements can be sent using a built-in SQL system procedure.

The index server 110 can include an authentication component 304 that can be invoked with a new connection with a client application 150 is established. Users can be authenticated either by the database system 105 itself (login with user and password) or authentication can be delegated to an external authentication provider. An authorization manager 306 can be invoked by other components of the database system 150 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 150 can be e received by the SQL processor 312. Data manipulation statements can be executed by the SQL processor 312 itself. Other types of requests can be delegated to the respective components. Data definition statements can be dispatched to a metadata manager 308, transaction control statements can be forwarded to the transaction manager 344, planning commands can be routed to a planning engine 318, and task related commands can be forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 330, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can stores relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can stores relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, undo and cleanup logs, shadow paging and savepoints. The persistence layer 346 can provide interfaces for writing and reading persisted data and it can also contain a logger component that manages a recovery log. Recovery log entries can be written in the persistence layer 352 (in recovery log volumes 352) explicitly by using a log interface or implicitly when using the virtual file abstraction. The recovery log volumes 352 can include redo logs which specify database operations to be replayed whereas data volume 350 contains undo logs which specify database operations to be undone as well as cleanup logs of committed operations which can be executed by a garbage collection process to reorganize the data area (e.g. free up space occupied by deleted data etc.).

The persistence layer 236 stores data in persistent disk storage 348 which, in turn, can include data volumes 350 and/or recovery log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

In many applications, data systems may be required to support operations on a 24/7 schedule, and data system providers may be required to guarantee a minimum amount of downtime, that is time during which a system is not able to fully support ongoing operations. When a system is required to ensure an agreed level of operational performance, it may be referred to as a high availability system ("HA"). One solution to guarantee substantially continuous uptime with no, or very little, downtime is to maintain one or more hot-standby systems. A hot-standby system, or a backup system, is a system that may be activated quickly in the event of a disruption causing one or more functions of a primary operational data system to fail. Such a disruption may be referred to as a disaster, and the process of restoring a data system to full operations may be referred to as disaster-recovery ("DR").

A hot-standby system may be an exact replica of a primary operational system that is capable of providing all the functions provided by the primary operational system, or a hot-standby may be a system that is capable of providing a minimum amount of essential functionality during the time required to restore the primary operational data system. The time it takes after a disaster to restore full, or minimum, functionality of a data system, for example by bringing a hot-standby online, is referred to as recovery time. In an effort to minimize recovery time, and thereby downtime, a hot-standby system is typically in a state just short of fully operational. For example, a system architecture may be implemented in which all functional systems of the hot-standby are active and operational, and all system and data changes or updates occur in the primary operational system and the hot-standby at the exact same time. In such a case the only difference in the two systems may be that the primary is configured to respond to user requests and the secondary is not. In other hot-standby systems one or more functions may be disabled until mission critical systems of the hot-standby are observed to be operating normally, at which time the remaining functions may be brought online.

In many applications, data systems may be required to provide prompt responses to users and applications that rely on the data managed by the data system. Providers and designers of data systems may be required to guarantee a minimum average throughput over time, or an average maximum response time. The speed with which a data system responds to a request from a user or an application may be dependent on many factors, but all systems are limited in the number of requests they can handle in a given period of time. When a data system manages a relatively large amount of data, and supports a relatively large number of users or applications, during high workloads a request may be queued, buffered or rejected until sufficient system resources are available to complete the request. When this happens, average throughput goes down and average response time goes up. One solution to such a problem is to distribute the workload across multiple processing systems. This is known as load balancing.

One drawback to load balancing and HA systems is that they may require additional processing systems, which in turn have a high cost. It is often the case with certain data systems supporting critical functions of an organization that additional systems are needed to perform both load balancing and HA functionality to efficiently support continuous operations. Given the redundant nature of DR systems, they are often left undisturbed unless a disaster occurs. Thus, in some circumstances, it is desirable to implement and maintain a combination high availability/disaster recovery (HA/DR) system with load balancing that includes both a primary operational system and a hot-standby system, and potentially one or more tertiary systems. Such a combination system allows for load balancing of workload between the processing systems of both the primary operational system and the hot-standby system, without disrupting the ability of the HA/DR system to assume primary functionality in the event of a disaster.

Figure 4:
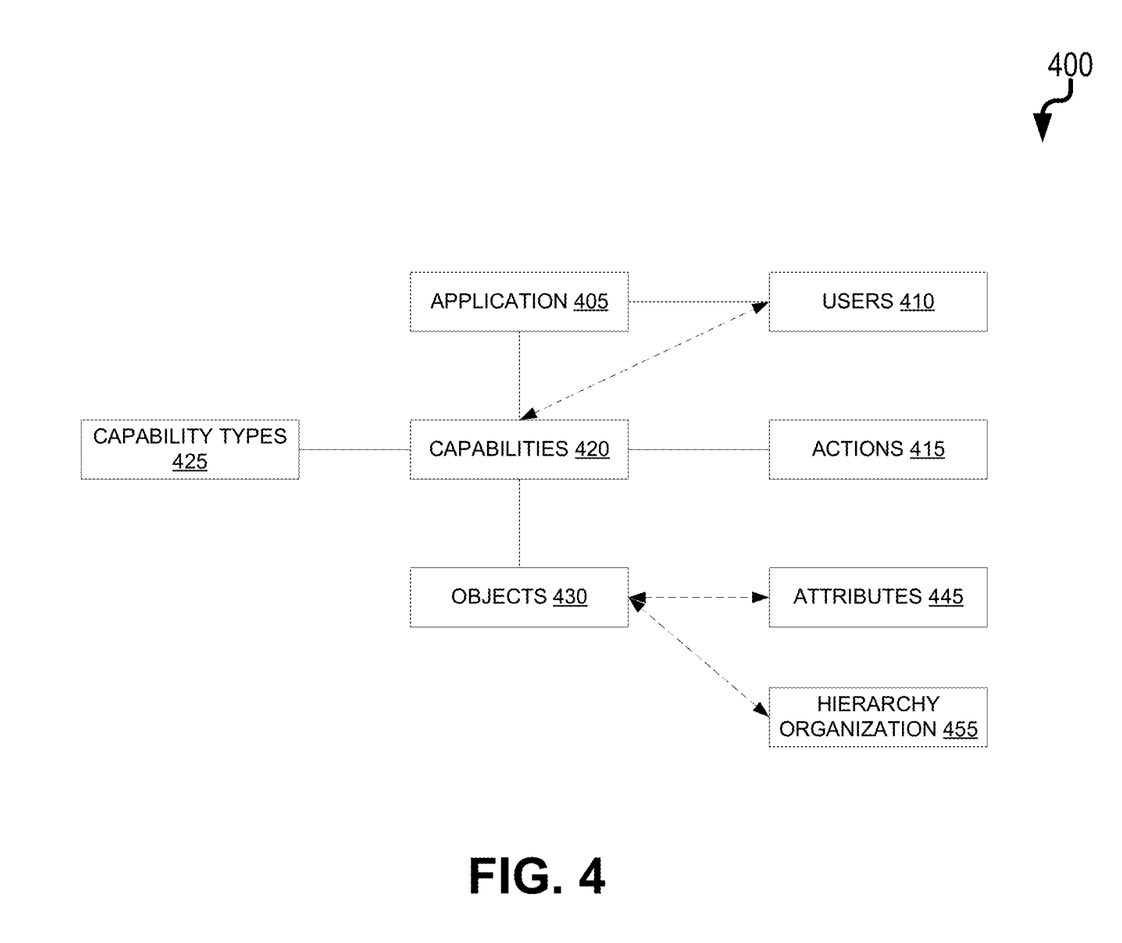
FIG. 4 is a block diagram illustrating an example system for providing instance based user authorization to execution actions n object instances based on defined capabilities.

FIG. 4 is a block diagram 400 illustrating an example system for providing instance based user authorization to execution actions on object instances based on defined capabilities. Application 405 can be a software application or an application service, which provides functionality to be consumed by one or more users 410. One or more users 410 can be associated with different roles and can be permitted to perform different tasks based on authorizations rights. A definition of the authorization rights for object instances associated with an application 405 can be provided in relation to specified actions. The authorization rights can be determined based on attributes of the object instances and on hierarchy organization of the instance objects. For example, a user 410 can be allowed to enter information associated with clients in the application 405. One or more users 410 can be allocated into user groups. Application 405 can be associated with capabilities 420. Capabilities 420 can specify how different rights are provided to one or more users 410 for performing relevant actions on relevant sets of objects. Capabilities 420 can be associated with a list of actions defined by actions 415. Capabilities 420 can be associated correspondingly with objects 430 related to application 405. Object 430 can be associated with provided functionality based on implemented logic of application 405. One or more users 410 can be associated with one or more capabilities 420 that can, for example, define that the user 410 is authorized to perform an action, such as a read operation on a given object or set of objects 430.

Objects 430 can be defined according to an object model defining one or more attributes 445. Data for object 430 can be stored in one or more database tables including attributes 445 (e.g., columns) to describe the object instances. Such database tables can be stored in an in-memory database structure as described in FIGS. 1-3 and in any other kind of database system. An object 430 can be associated with one or more attributes 445. Object 430 can also be associated with a hierarchy organization 455. Hierarchy organization 455 can specify hierarchical relationships between groups of objects and can include hierarchal levels. The hierarchical levels can be used to allocate an object to a certain hierarchy level. For example, hierarchy organization 455 can be defined for objects that are associated with different locations. Such locations can be generalized in a hierarchy order. A location hierarchy order can include, for example, world, country, region, city, etc.

Capabilities can be defined on an attribute 445 basis and on a hierarchy basis. In such manner, the capabilities 420 can be defined with a unified authorization approach to both attributes 445 and hierarchy organization 455. Object 430 can be associated with actions 415. Capabilities 420 can be defined in relation to specific actions 415 and objects 430. Object 430 can be associated with an action 415 based on criteria related to attributes 445 and hierarchy organization 455. Capability types 425 can serve as a template for capabilities 420. Capability types 425 can include definitions of a mapping between authorization rights, users 410, and objects 430. Properties of a given capability 420 can be defined by the capability type 425, from which it is derived. In some variations, capability types 425 can be treated as low-level content. Capability types 425 can be hard-coded, predefined, and delivered by an application product provider.

Based on a received request from a user 410 to perform an action 415, application 405 can perform an authorization result to the user 410. Such authorization result can specify whether the user 410 is authorized to perform the requested action 415 on object 430. Capabilities 420 can be used to determine how to the authorization results are given to users 410 in relation to objects 40. An evaluation of objects 430 can be performed through filtering the object 430 based on capabilities 420. A filtering term can be defined when evaluating whether the user 410 has authorization rights to perform an action 415 on a requested object 430. When a filtering term, defined in relation to object 430, is evaluated to tur, then the user 410 can be authorized to execution an action 415. The corresponding capability types 425 can be used to determine whether capabilities 420 with associated actions 415 and determined filter terms are well defined.

Figure 5:
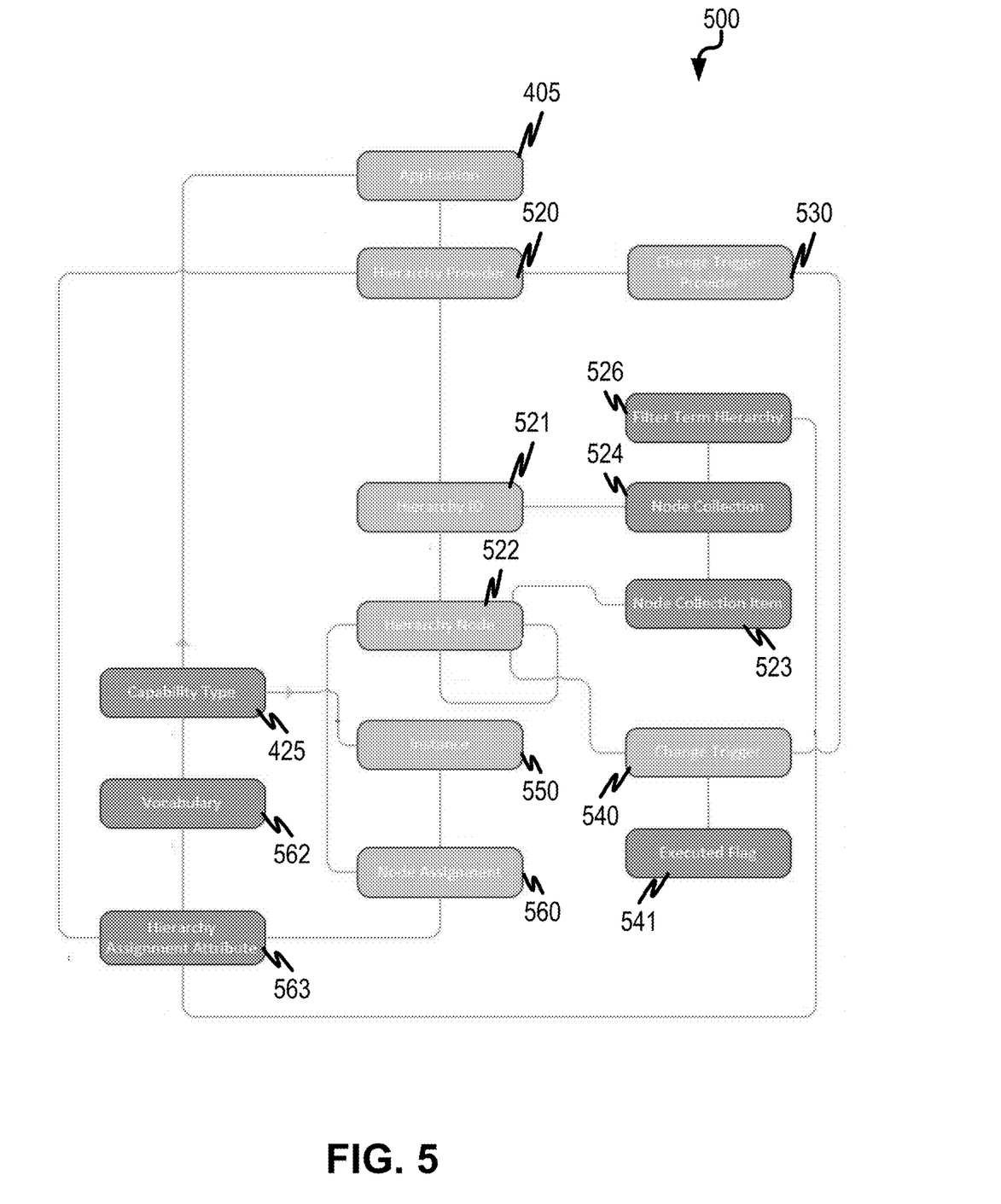
FIG. 5 is a block diagram illustrating an integration between an application owned hierarchy and re-usable user installed application components which provide instance based data access based on an application hierarchy.

FIG. 5 is a block diagram 500 illustrating an integration between an application owned hierarchy and re-usable user installed application components which provide instance based data access based on an application hierarchy. An application object 405 includes a hierarchy provider object 520. A hierarchy provider object 520 delivers hierarchy identifications 521 and hierarchy nodes 522. Hierarchy provider object 520 also includes change triggers 540 with respect to hierarchy changes via change trigger provider object 530. Change triggers 540 are executed within the unified instance authorizations as annotated by one or more executed flags 541. Change triggers 540 indicate when a change has been made to one or more nodes and/or object groups. Explosion tables can be used to calculate object group collections. Such executions and explosion table creation are described by U.S. Patent Publication No. 2018/0144150 A1, entitled "Unified Instance Authorization Based on Attributes and Hierarchy Assignment," the contents of which is incorporated herein by reference in its entirety. The application hierarchy 500 also includes assigned instance objects 550 and node assignment objects 560 (e.g., objects 430). Such a node assignment is reflected in the vocabulary 562 and capability types 425 via a hierarchy assignment attribute 563. An instance object 550 can have a field that can store a reference to a particular node in the hierarchy. A hierarchy assignment attribute 563 references to the application owned hierarchy. For a hierarchy identification 521 there can be defined several a node collection 524 or object group collections. The node collection 524 can include hierarchy node collection items or object group collection items. A filter term type of hierarchy 526 can refer to one or more node collections 524 or object group collections.

Figure 6:
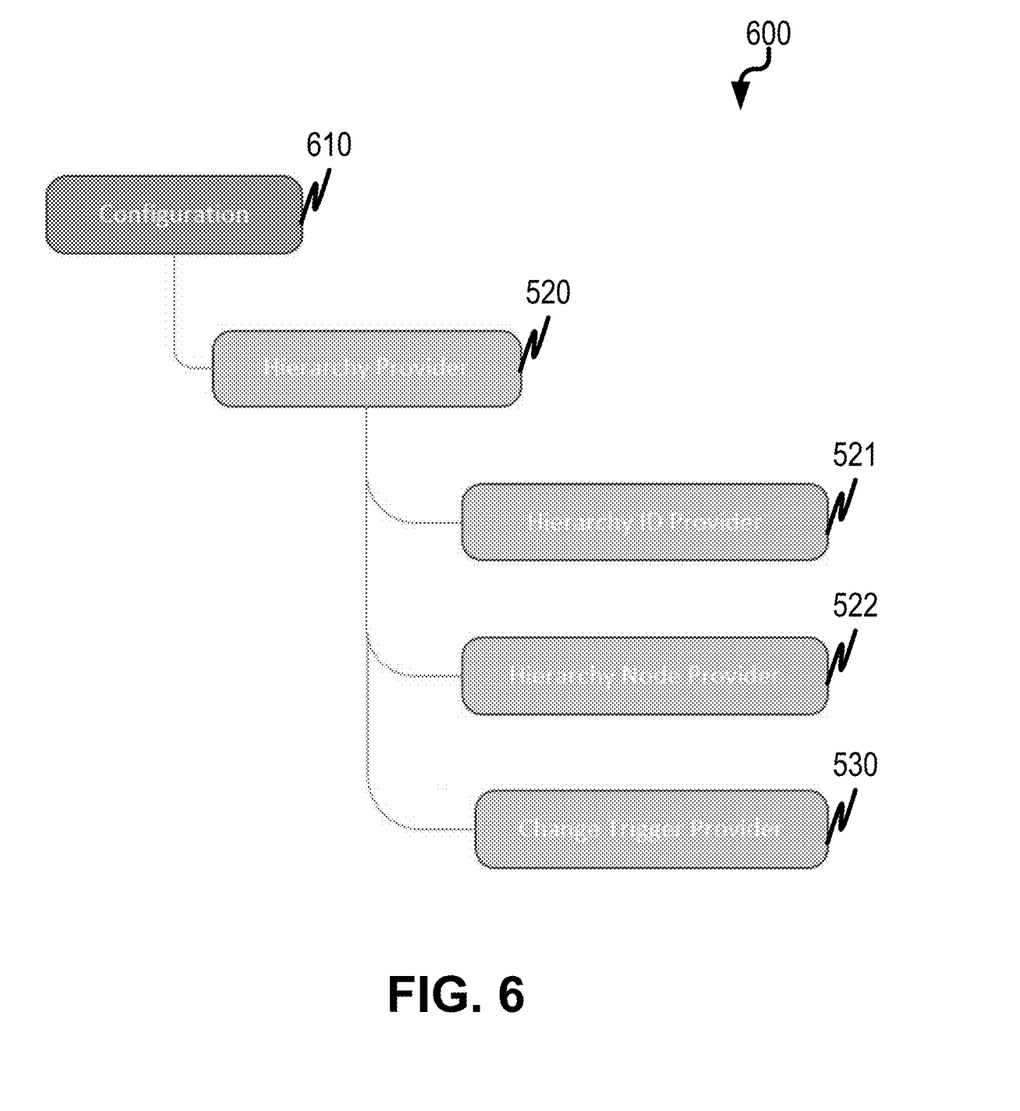
FIG. 6 is a structure diagram illustrating a hierarchy provider configuration.

FIG. 6 is a structure diagram 600 illustrating a hierarchy provider configuration 610. Hierarchy provider 520 can provide one or more database table views to users 410 for tracking of modifications made to an application owned hierarchy. For example, hierarchy provider 520 can provide a database table view of a hierarchy ID 521, a database view of the hierarchy node table 522, and a reference to an explosion change trigger table 530. The names of the views can be configured by a developer re-using the instance authorization service for a hierarchy service in an application.

Figure 7A:
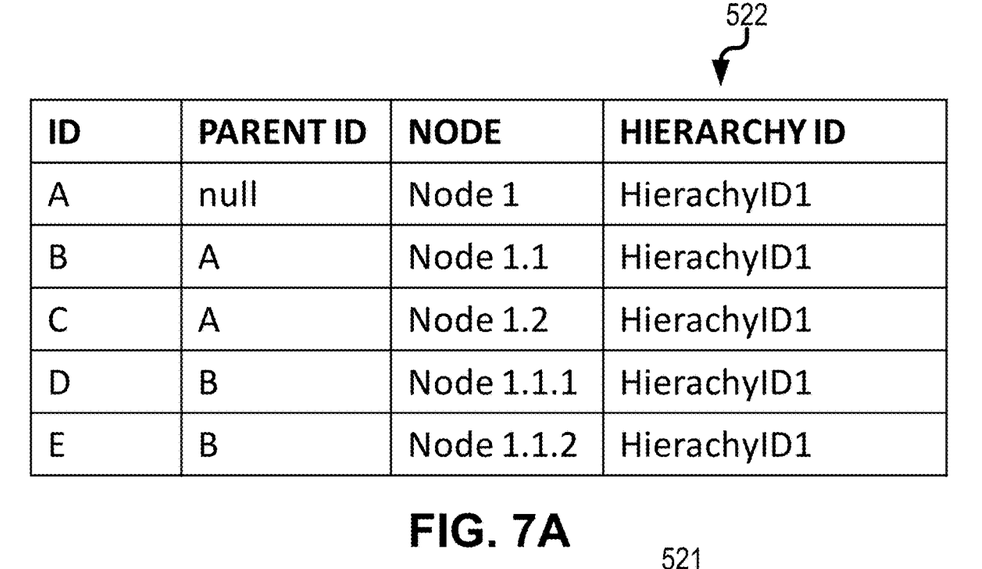
FIG. 7A depicts an example database table view of hierarchy node table.
Figure 7B:
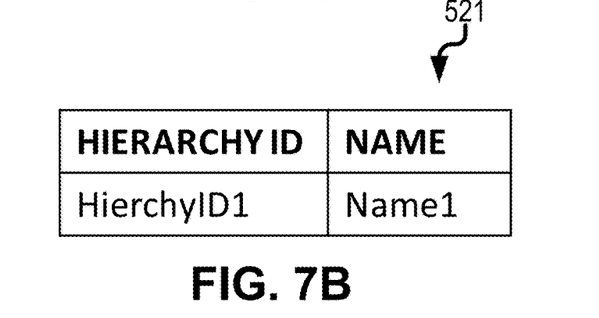
FIG. 7B depicts an example database table view of hierarchy ID corresponding to hierarchy node table of FIG. 7A.

FIG. 7A depicts an example database table view of hierarchy node table 522. Hierarchy node table 522 can include a listing of parent/child relationships between one or more nodes of an application 405. For example, as illustrated in FIG. 7A, Node A is the parent node associated with corresponding child nodes B and C. Node B is also a parent node associated with corresponding child nodes D and E. In this example, each of nodes A, B, C, D, and E are associated with a hierarchy identification of 'HierarchyID1." FIG. 7B depicts an example database table view of hierarchy ID 521 corresponding to hierarchy node table 522 of FIG. 7A. Hierarchy ID 521, in accordance with the example hierarchy node table 522, lists a single hierarchy ID of 'HierarchyID1."

Figure 7C:
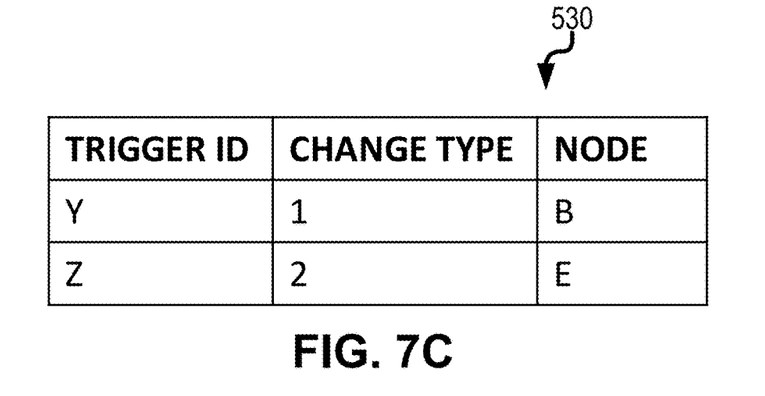
FIG. 7C depicts an example database table view of an explosion change trigger table.

FIG. 7C depicts an example database table view of an explosion change trigger table 530. Modifications to application owned hierarchies can be identified in an explosion change trigger table 530. Such modifications, for example, can include node reassignment, node creation, and/or node removal from hierarchy node table 522. When modifications are made to hierarchy node table 522, a corresponding entry can be created within an explosion change trigger table 530. For example, user 410 can create a new node F (not shown in FIG. 7A) and assign it to parent node B. The creation of node F can be tracked in explosion change trigger table 530 via the creation of trigger ID 'Y'. The creation is tracked by a corresponding 'change type', in this example a value of '1' corresponds with a 'change_type_item_create'. In another example, a modification to hierarchy node table 522 can include removing, by user 410, one or more nodes, such as node E. Upon removal of node E from hierarchy node table 522, a corresponding trigger id 'Z' can be added to the explosion change trigger table 530. In this example, the creation is tracked by a corresponding 'change type' of '2' which can correspond with a 'change_type_item_remove'. It is noted that these examples are for explanation purposes, and the various identification values, node names, hierarchy ID names, trigger ID names, and change types can depend upon each application 405 as defined by the user 410 and/or the application product provider.

Once the various modifications are written to the explosion change trigger table 530, it is known to the unified instance authorization application and subsequently processed by the explosion-update service, that is part of the re-usable solution. The explosion table can be updated as described in detail in U.S. Patent Publication No. 2018/0144150 A1, entitled "Unified Instance Authorization Based on Attributes and Hierarchy Assignment," the contents of which is incorporated herein by reference in its entirety.

Figure 8:
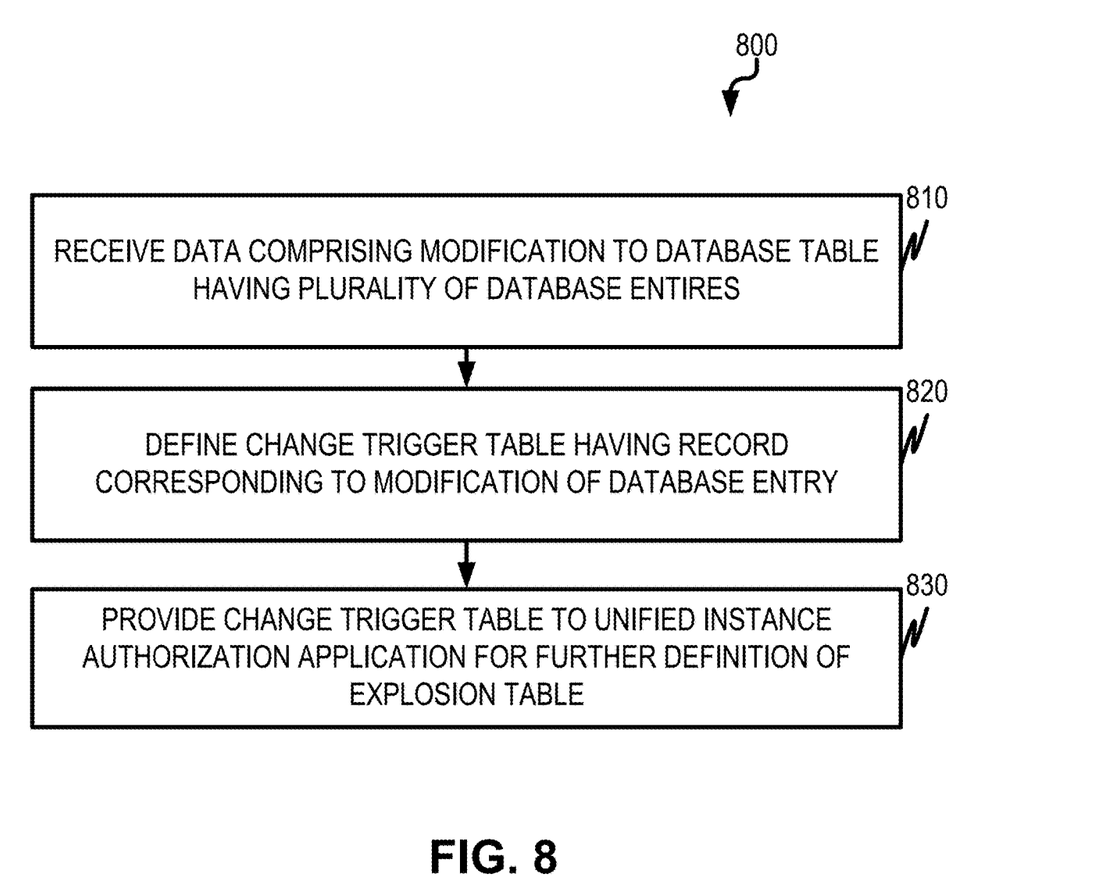
FIG. 8 is a process flow diagram illustrating tracking modifications to a hierarchical database table using an application owned hierarchy.

FIG. 8 is a process flow diagram 800 illustrating tracking modifications to a hierarchical database table using an application owned hierarchy. Data is received, at 810, which includes a modification to the content in a database table (e.g., hierarchical node table 522). The database table includes a plurality of database entries for each node (e.g., node ID A, B, C, D, E). A change trigger table (e.g., explosion change trigger table 530) is defined, at 820, to include a record corresponding to the modification. For example, a change type can be assigned to each modification which identifies whether the entry was created, deleted, and/or reassigned to a different parent/child node. The change trigger table (e.g., explosion change trigger table 530) is provided, at 830, to a unified instance authorization application for changing the content of an explosion table which incorporates the modifications identified by the explosion change trigger table 530.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 9:
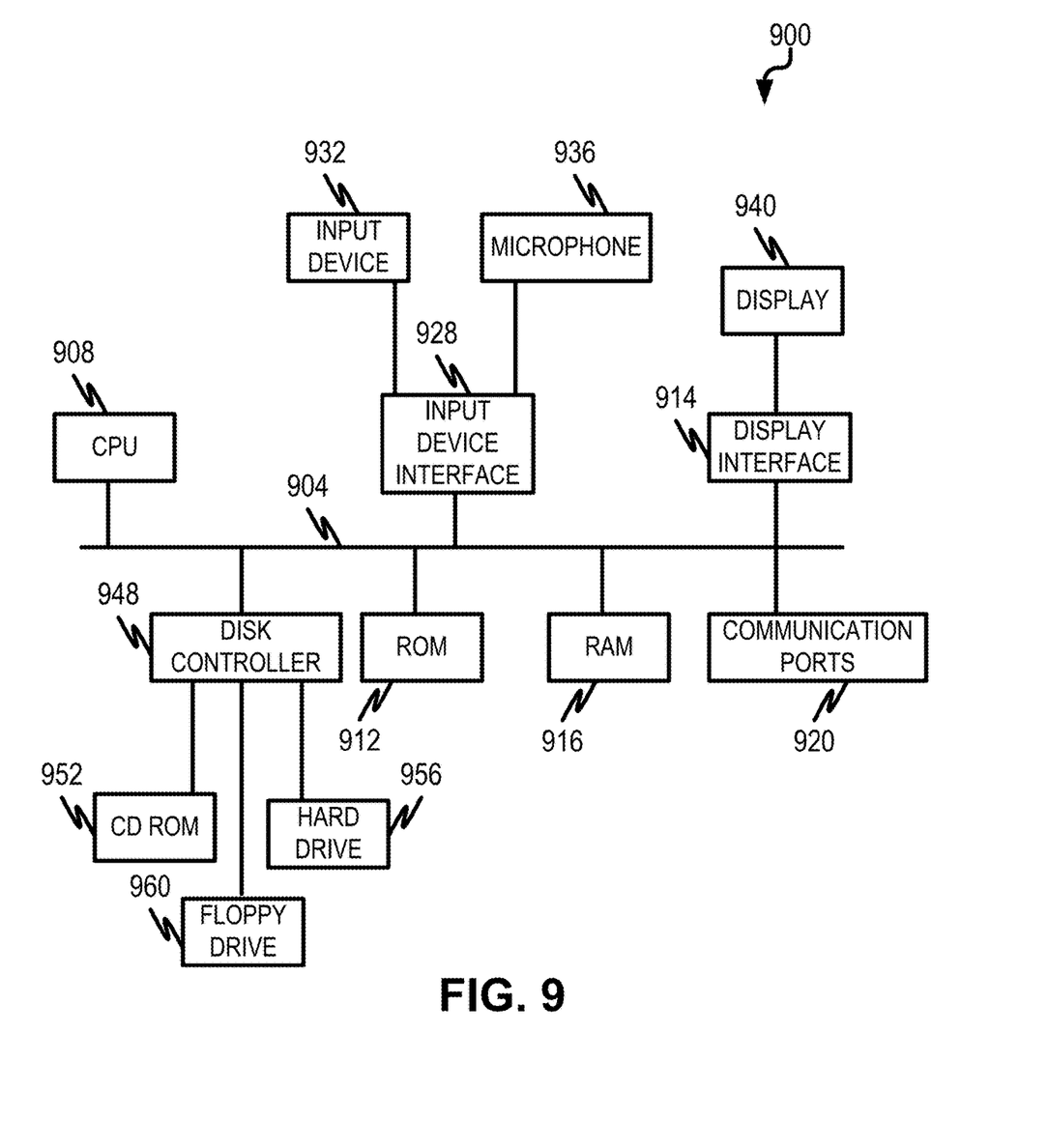
FIG. 9 is a diagram illustrating a sample computing device architecture for implementing various aspects described herein.

FIG. 9 is a diagram 900 illustrating a sample computing device architecture for implementing various aspects described herein. A bus 904 can serve as the information highway interconnecting the other illustrated components of the hardware. A processing system 908 labeled CPU (central processing unit) (e.g., one or more computer processors/data processors at a given computer or at multiple computers), can perform calculations and logic operations required to execute a program. A non-transitory processor-readable storage medium, such as read only memory (ROM) 912 and random access memory (RAM) 916, can be in communication with the processing system 908 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 948 can interface one or more optional disk drives to the system bus 904. These disk drives can be external or internal floppy disk drives such as 960, external or internal CD-ROM, CD-R, CD-RW or DVD, or solid state drives such as 952, or external or internal hard drives 956. As indicated previously, these various disk drives 952, 956, 960 and disk controllers are optional devices. The system bus 904 can also include at least one communication port 920 to allow for communication with external devices either physically connected to the computing system or available externally through a wired or wireless network. In some cases, the communication port 920 includes or otherwise comprises a network interface.

To provide for interaction with a user, the subject matter described herein can be implemented on a computing device having a display device 940 (e.g., a CRT (cathode ray tube) or LCD (liquid crystal display) monitor) for displaying information obtained from the bus 904 to the user and an input device 932 such as keyboard and/or a pointing device (e.g., a mouse or a trackball) and/or a touchscreen by which the user can provide input to the computer. Other kinds of input devices 932 can be used to provide for interaction with a user as well; for example, feedback provided to the user can be any form of sensory feedback (e.g., visual feedback, auditory feedback by way of a microphone 936, or tactile feedback); and input from the user can be received in any form, including acoustic, speech, or tactile input. In the input device 932 and the microphone 936 can be coupled to and convey information via the bus 904 by way of an input device interface 928. Other computing devices, such as dedicated servers, can omit one or more of the display 940 and display interface 914, the input device 932, the microphone 936, and input device interface 928.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for tracking modifications of a hierarchical database table of an application implemented by one or more data processors forming one or more computing devices, the method comprising:
    receiving data comprising a modification to the hierarchical database table having a plurality of database entries;
    mapping, by defined capabilities, user authorization rights for controlling access to levels of the hierarchical database table and for performing actions on at least one object instance within the levels of the hierarchical database table,
    wherein the hierarchical database table comprises the defined capabilities;
    defining a change trigger table having a record corresponding to the modification of a database entry of the plurality of database entries; and
    providing the change trigger table to a unified instance authorization application for further definition of an explosion database table.

2. The method of claim 1, further comprising defining the explosion database table associated with an object group collection, wherein the object group collection includes one or more inherent object groups defined in a hierarchy.

3. The method of claim 1, further comprising providing a database table view of the explosion database table to a user on a graphical user interface, the database table view containing data updates incorporating the modification.

4. The method of claim 1, further comprising providing the change trigger table to another application within the same hierarchy of the application for use across applications.

5. The method of claim 1, further comprising assigning a change type to the modification based on data manipulation of the hierarchical database table made by the modification.

6. The method of claim 1, wherein the modification comprises at least one of a deletion of the database entry within the hierarchical database table, a reassignment of the database entry to another database entry within the hierarchical database table, and a creation of a new database entry within the hierarchical database table.

7. The method of claim 1, wherein the hierarchical database table is an application owned hierarchy providing a read interface at a database level.

8. The method of claim 4, wherein the hierarchical database table is accessible to other hierarchies of the application.

9. The method of claim 1, wherein the hierarchical database table is stored in an in-memory database.

10. A system comprising:
   at least one data processor; and
   memory storing instructions, which when executed by at least one data processor result in operations comprising:
      receiving data comprising a modification to a hierarchical database table having a plurality of database entries;
      mapping, by defined capabilities, user authorization rights for controlling access to levels of the hierarchical database table and for performing actions on at least one object instance within the levels of the hierarchical database table,
      wherein the hierarchical database table comprises the defined capabilities;
      defining a change trigger table having a record corresponding to the modification of a database entry of the plurality of database entries; and
      providing the change trigger table to a unified instance authorization application for further definition of an explosion database table.

11. The system of claim 10, wherein the operations further comprise defining the explosion database table associated with an object group collection, wherein the object group collection includes one or more inherent object groups defined in a hierarchy.

12. The system of claim 10, wherein the operations further comprise providing a database table view of the explosion database table to a user on a graphical user interface, the database table view containing data updates incorporating the modification.

13. The system of claim 10, wherein the operations further comprise providing the change trigger table to another application within the same hierarchy of the application for use across applications.

14. The system of claim 10, wherein the operations further comprise assigning a change type to the modification based on data manipulation of the hierarchical database table made by the modification.

15. The system of claim 10, wherein the modification comprises at least one of a deletion of the database entry within the hierarchical database table, a reassignment of the database entry to another database entry within the hierarchical database table, and a creation of a new database entry within the hierarchical database table.

16. The system of claim 10, wherein the hierarchical database table is an application owned hierarchy providing a read interface at a database level.

17. The system of claim 16, wherein the hierarchical database table is accessible to other hierarchies of the application.

18. The system of claim 10, wherein the hierarchical database table is stored in an in-memory database.

19. The system of claim 10, further comprising an in-memory database.

20. A non-transitory computer programmable product storing instructions which, when executed by at least one data processor forming part of at least one computing device, implements operations comprising:
   receiving data comprising a modification to a hierarchical database table having a plurality of database entries;
   mapping, by defined capabilities, user authorization rights for controlling access to levels of the hierarchical database table and for performing actions on at least one object instance within the levels of the hierarchical database table,
   wherein the hierarchical database table comprises the defined capabilities;
   defining a change trigger table having a record corresponding to the modification of a database entry of the plurality of database entries; and
   providing the change trigger table to a unified instance authorization application for further definition of an explosion database table.

* * * * *